Nov. 11, 1947.  D. KLINE ET AL  2,430,720

CONVEYOR AND DRIVE

Filed June 28, 1945

Inventors
Donald Kline &
Edgar M. Plett
By Robert A. Kahn

Patented Nov. 11, 1947

2,430,720

UNITED STATES PATENT OFFICE 2,430,720

CONVEYOR AND DRIVE

Donald Kline, Aurora, and Edgar M. Plett, Chicago, Ill., assignors to Blackstone Manufacturing Co., Inc., Chicago, Ill., a corporation of Illinois Application June 28, 1945, Serial No. 602,030

2 Claims. (Cl. 198—203)

This invention relates to a conveyor and particularly to a sheet metal conveyor susceptible to simple and economical manufacture and assembly. While many types of conveyor systems are known and available, all are characterized by mechanical complexity and expensive construction.

The type of conveyor to which this invention appertains is the link type where the length may be as desired. However, the construction embodied by this invention differs from the prior art in that each link is mechanically simple and so designed as to require little equipment for the manufacture thereof. In general, the invention provides a conveyor wherein each link has its ends so shaped that nesting of one end within an adjacent end may occur. A desirable feature of a conveyor embodying the invention resides in the fact that adjacent links are capable of relative movement over a limited range only. Thus, a conveyor section has the property of maintaining itself.

Figure 1:
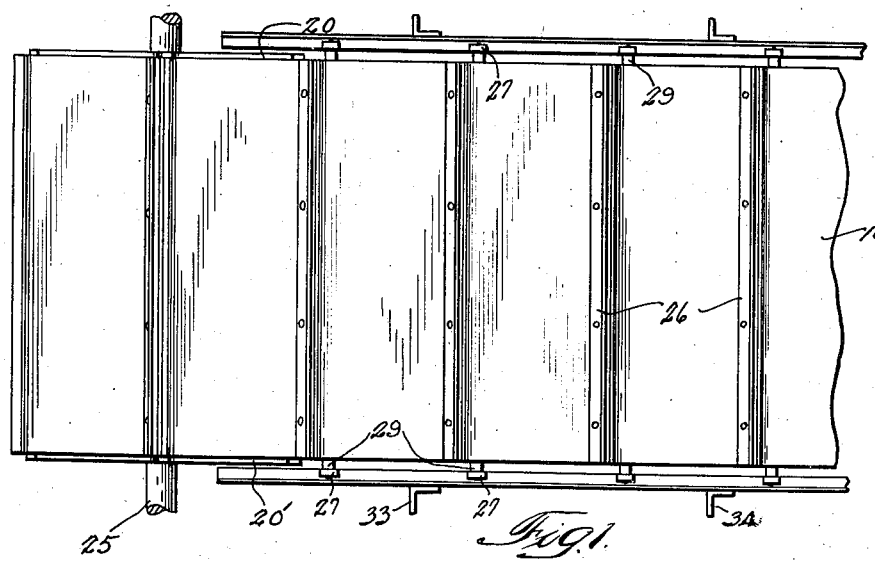
Figure 2:
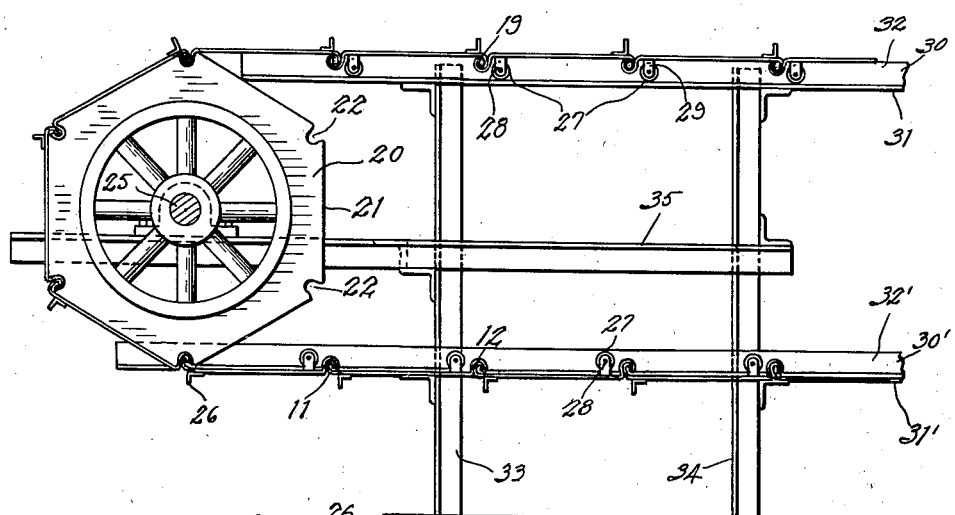
Figure 3:
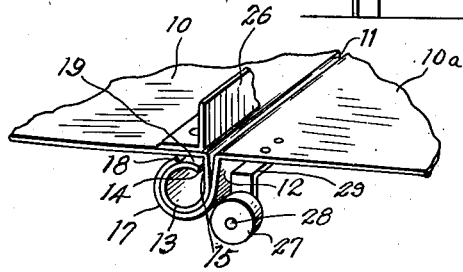

While the invention is susceptible to many variations, a preferred embodiment is shown in the drawings wherein Figure 1 is a top plan view of a conveyor embodying the invention. Figure 2 is a side elevation showing the conveyor of Figure 1. Figure 3 is a detail showing the nested adjacent link ends.

Inasmuch as the links are all identical, only one will be described in detail. Thus, link 10 has ends 11 and 12 transverse to the line of conveyor movement. Link 10 itself may be formed of sheet metal such as sheet steel having any desired width or dimension parallel to ends 11 and 12.

Link 10 has end 11 in the shape of a curled tubular channel 13 with the free edge 14 defining a gap 15. It will be noted that channel 13 defines a cylinder whose axis is parallel to the plane of link 10 and spaced therefrom. Channel 13 is bent in a circular shape.

As shown, channel 13 extends the full width of link 10. It is, however, possible to break this up and form a plurality of portions alined transversely across link 10. The curling itself may be formed by means well known in the art and, in general, requires simple mechanism.

End 12 is shaped in a manner generally similar to 11 with the exception that curved portion 17 is shaped sufficiently larger than 13 so that the smaller curved portion may nest within the larger curved portion. It is clear that channels 13 and 17 are offset from the plane of link 10.

Thus, as shown, curved portion 17 has free edge 18 defining air gap 19. Two links 10 and 10a may be assembled by disposing them as shown in Figure 3 but laterally displaced. When curved portions 13 and 17 are properly alined, one link may be moved transversely with respect to the other link until both are properly adjusted.

It is clear that adjacent links are capable of a relatively limited angular movement. Thus, in Figure 3, if link 10a is regarded as stationary, link 10 can be moved up or down only a limited amount. In the downward movement of link 10, free edge 18 will define a limit. This limit will depend upon how close curved portion 17 is to the body of link 10. In general, it is preferred to have enough space between them, this space being the same as gap 19 in the position of the part shown in Figure 3, so that free edge 18 may enter into the same and actually contact the metal at end 11. In the upward movement of link 10, the sharp fold at end 11 will define a limit for turning.

A plurality of lengths may be assembled to form a continuous conveyor as shown in Figures 1 and 2. In order to drive the conveyor, a polygonal driver may be utilized. Thus, as shown in Figure 2, a hexagonal driving means 20 is provided. Driving means 20 has a plurality of sides 21, each side being bounded by curved slots 22. As is clearly evident from Figure 2, side 21 has a length equal to the length of link 10, with slots 22 being so shaped as to accommodate curved portions 17 of the links.

It is understood, of course, that the actual dimensions of curved portions 13 and 17 will determine the maximum angular movement of one link with respect to the other. This, in turn, will determine the type of driver or idler as the case may be which may be used with the conveyor. Thus, hexagonal driver 20 will have 120 degrees between adjacent sides 21. It is clear, therefore, that adjacent links 10 and 10a must be able to be bent so that an angle of 120 degrees therebetween may be formed with the curved portions 11 and 12 on the inside of the angle. It is possible, of course, to design the links so that driver 20 may be a pentagon or may have more than six sides. There is no upper limit as to the number of sides that a driver may have, since the angle of bending required for adjacent links grows smaller. Thus, referring to Figure 2, assuming that the conveyor system is designed to accommodate a hexagonal driver, it follows that the same links may be used with an octagonal driver.

In practice, drivers 20 may come in pairs as shown, 20 and 20', disposed at opposite sides of the conveyor. Suitable drive shaft 25 may be provided, it being understood that this axle is suitably journalled in bearings. Any source of power may be utilized for moving the conveyor.

It is possible to provide strips transversely of the conveyor for engaging material so that the same may be positively moved. Thus, each link 10 may have adjacent one end, 11 for example, angle strip 26 suitably fastened thereto across part or all of the width thereof. Angle strip 26 may be shaped and proportioned as desired, depending upon the desired characteristics.

By making the links of sufficiently heavy metal, the entire conveyor may be strong and stiff enough to maintain itself in position between drivers or idlers. However, suitable supporting means may be provided. Thus, each link may carry roller 27 rotatably mounted on pin 28 and carried by angle iron 29 so that the roller is normally beyond the side of the link. Each link may have one or more of these rollers on each side thereof, these rollers preferably extending down below the link plane as seen in Figure 3. It is possible, however, to dispose the roller on the other side of the link.

Cooperating with rollers 27 is an L-beam 30 whose flange 31 extends underneath rollers 27. The beam itself has web 32 normally beyond the sides of the links. As shown in Figure 1, the conveyor may have a supporting track on each side thereof for the top section. L-beams 30 may be supported by a suitable frame work such as, for example, formed by standards 33 and 34.

The bottom section of the conveyor, that is that portion of the conveyor coming from or going to the bottom of the drive wheels, may have similar supporting beams 30' with web 31' and flange 32' as shown. The L-beams may be supported at just the right height so that rollers 27 may ride on top of flange 31'. The various L-beams may be as long as desired, so that support for the conveyor throughout the full length thereof may be provided.

If desired, frame work 33 and 34 may carry beam 35 upon which the bearing structure for the driving wheels is disposed.

It is clear that a simple conveyor is provided and that this conveyor may be fabricated and assembled and disassembled with ease and with small cost. The assembly and disassembly is particularly advantageous, since no special tools are required.

What is claimed is:

1. A conveyor system comprising a conveyor belt and at least one driver, said belt consisting of a plurality of links, each link comprising a flat rectangular sheet metal body having the ends curled to form tubular channels, said channels being offset to said body on the same side thereof and being of different size so that the channel of one link may nest within the adjacent channel of the next link, said driver comprising a polygonal member having sides equal in length to the length of a link, said driver having recesses at the meeting points of adjacent sides of sufficient depth to accommodate a pair of nested channels and to transmit movement from said driver to said belt solely through the engagement of said channels within said recesses.

2. The system of claim 1 wherein each link has at least one roller extending beyond each side of the conveyor and wherein track means are provided with which said rollers cooperate for supporting said conveyor.

DONALD KLINE.
EDGAR M. PLETT.

REFERENCES CITED

The following references are of record in the file of this patent:

UNITED STATES PATENTS

| Number | Name | Date |
|---|---|---|
| 464,197 | Lanphear | Dec. 1, 1891 |
| 1,075,548 | Cilley | Oct. 14, 1913 |
| 1,380,563 | Keebler | June 7, 1921 |
| 1,804,423 | Krenzke | May 12, 1931 |

FOREIGN PATENTS

| Number | Country | Date |
|---|---|---|
| 19,810 | Great Britain | 1903 |